(No Model.)
T. A. NAYLOR.
MEASURING DEVICE FOR ICE CREAM OR OTHER SIMILAR SUBSTANCES.
No. 384,776.
Patented June 19, 1888.
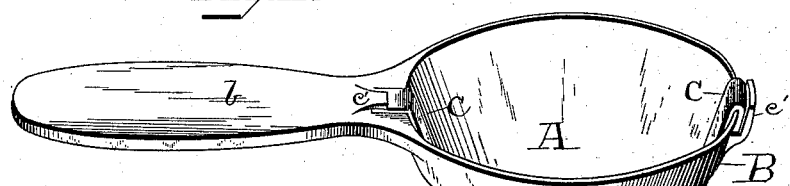
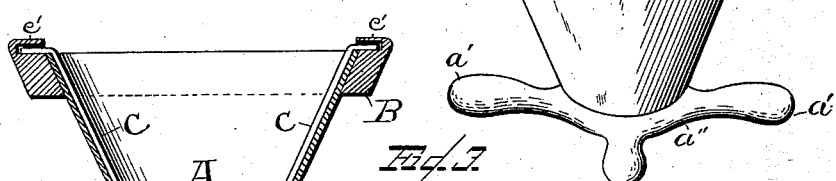
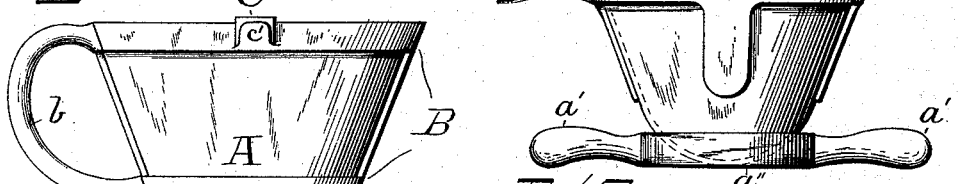
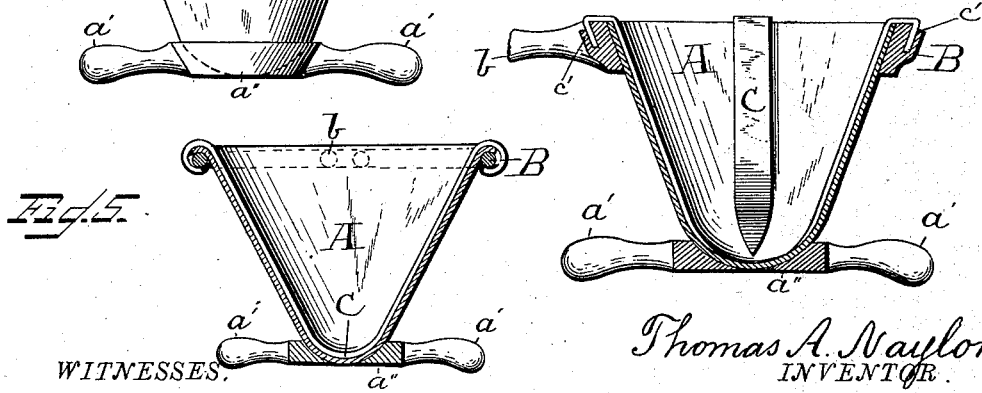
WITNESSES:
F. L. Ourand
Maggie Turner
Thomas A. Naylor
INVENTOR.
by Price & Steuart,
Attorneys.

United States Patent Office.

THOMAS A. NAYLOR, OF BALTIMORE, MARYLAND.

MEASURING DEVICE FOR ICE-CREAM OR OTHER SIMILAR SUBSTANCES.

SPECIFICATION forming part of Letters Patent No. 384,776, dated June 19, 1888.

Application filed February 2, 1888. Serial No. 262,692. (No model.)

*To all whom it may concern:*

Be it known that I, THOMAS A. NAYLOR, of the city of Baltimore, in the State of Maryland, have invented certain new and useful Improvements in Measuring Devices for Measuring Ice-Cream or other Similar Substances, of which the following is a full and complete specification.

In the drawings similar letters of reference indicate similar parts.

Figure 1 is a perspective view of my measuring device. Fig. 2 is a vertical section of the same. Figs. 3, 4, 5, and 6 are modified forms of the same.

In the drawings, A represents a cup, made, by preference, conical in shape; but it may be made in any desired form, and provided on its bottom on the outside with one or more projections, $a'$ $a'$, by which it may be turned. These projections, as shown in the drawings, are made four in number and arranged upon the periphery of a ring, $a''$, that is soldered to the bottom of the cup, and serve the double purpose of affording means to turn the cup, while at the same time they act as feet upon which the cup may stand or rest when not in use.

B is a rim, of metal or other suitable material, which is provided with a handle, $b$, by which it and the cup which fits into it are carried. This rim I prefer to make beveled on the interior, so as to fit closely the exterior of the conical cup, and of such size that the top of the cup will be flush with the top of the rim; but I have shown in the drawings several other forms, any of which may be used with almost equal advantage.

C represents a knife or knives, which are secured to the rim B in any suitable manner, and which extend down into the cup A to or near the bottom, and which lie close to the interior surface of the cup, and when the cup is of other than conical form the knives are made of similar shape to the cup, so that they will lie close to its interior surface. The knives thus secured to the ring and passing over the edge of the cup and down into its interior serve also as guides or retainers of the cup within the ring. In several of the modified forms shown the knife is made in one piece, fastened to the rim at either end and on opposite sides thereof, and is made of the same shape as the interior of the cup, passing down one side, across the bottom, and up the other.

I prefer to attach the knife or knives to the ring in the manner shown in all of the drawings save Fig. 5—that is to say, by casting one or more lugs, $c'$ $c'$, onto a malleable-iron ring and then fitting the knife to the cup and securing it to the ring by hammering the lugs down upon the ends of the knife. In Fig. 5 the knife is soldered to the ring, or may be riveted or otherwise attached.

The operation of my device is as follows: The measure may be used as a scoop or spoon to take up the cream from a can, or it may be filled by means of a spoon. When it is full, it is inverted and the cup turned with one hand, while the rim and knives are held stationary with the other. The knives, as the cup is turned, cut the cream loose from it and allow it to fall upon a plate or dish below.

Having thus described my invention, what I claim, and desire to secure by Letters Patent, is—

In a device for measuring ice-cream or other similar substances, the combination of a measuring cup or vessel, with a rim or holder for said vessel of such a size as to fit the exterior of said vessel and permit the same to be freely turned therein, with a scraping knife or knives secured to said rim or cup-holder and extending over the edge of the cup and down into its interior, in contact with the sides of the same and conforming in shape thereto.

THOMAS A. NAYLOR.

Attest:
FELIX R. SULLIVAN,
L. RABILLON,
GEORGE E. SAVILLE.